United States Patent [19]

Hamoda

[11] Patent Number: 4,989,112
[45] Date of Patent: Jan. 29, 1991

[54] APPARATUS FOR DISCRIMINATING TYPES OF TAPE CASSETTES

[75] Inventor: Keiji Hamoda, Fukaya, Japan

[73] Assignee: Kabushiki Kaisha Toshiba, Kawasaki, Japan

[21] Appl. No.: 286,867

[22] Filed: Dec. 20, 1988

[30] Foreign Application Priority Data

Dec. 21, 1987 [JP] Japan .................................. 62-321503

[51] Int. Cl.$^5$ ............................................. G11B 15/48
[52] U.S. Cl. .................................. 360/137; 360/74.5; 360/73.01; 242/75.51
[58] Field of Search ..................... 360/92, 73.01, 73.06, 360/74.1–74.3, 74.5, 137; 318/7; 242/75.51, 75.52

[56] References Cited

U.S. PATENT DOCUMENTS

| | | | |
|---|---|---|---|
| 4,160,195 | 7/1979 | Sakamoto | 318/7 |
| 4,172,231 | 10/1979 | d'Arc et al. | 242/75.51 X |
| 4,232,371 | 11/1980 | Kamoto | 242/75.51 X |
| 4,357,643 | 11/1982 | d'Arc | 360/137 |
| 4,398,300 | 8/1983 | d'Arc et al. | 360/94 X |
| 4,817,887 | 4/1989 | Harigaya et al. | 318/7 X |

FOREIGN PATENT DOCUMENTS

| | | |
|---|---|---|
| 54-145513 | 11/1979 | Japan . |
| 58-29156 | 2/1983 | Japan . |
| 8001522 | 7/1980 | PCT Int'l Appl. . |
| 1555059 | 11/1979 | United Kingdom . |
| 2036304 | 6/1980 | United Kingdom . |
| 2039127 | 7/1980 | United Kingdom . |
| 2109540 | 6/1983 | United Kingdom . |

Primary Examiner—John H. Wolff
Attorney, Agent, or Firm—Cushman, Darby & Cushman

[57] ABSTRACT

A tape cassette type detection apparatus has a tape transit control circuit which supplies a first control signal to a supply reel motor and a take-up reel motor and a second control signal thereto at timing delayed from the first control signal by a predetermined period of time to move a tape wound around a supply reel and a take-up reel in a predetermined direction during a predetermined period. Upon rotation of the supply and take-up reels, pulses are generated by pulse generators in response to the first and second control signals, and are counted by reel counters for periods set by measurement control circuits. Thereafter, the count values are supplied to a rotation ratio calculation circuit as first movement speed data. A pulse generator detects rotation of a capstan for moving the tape and generates pulses. The pulses generated by the pulse generator are counted by capstan counters. An operation circuit calculates the rotation ratio of the tape based on second movement speed data obtained by counting of the capstan counters and the first movement speed data obtained by the rotation ratio calculation circuit and supplied from a system control circuit. The operational circuit discriminates the tape of the tape cassette based on the rotation ratio of the tape in accordance with a signal from a tape-type data generator.

16 Claims, 8 Drawing Sheets

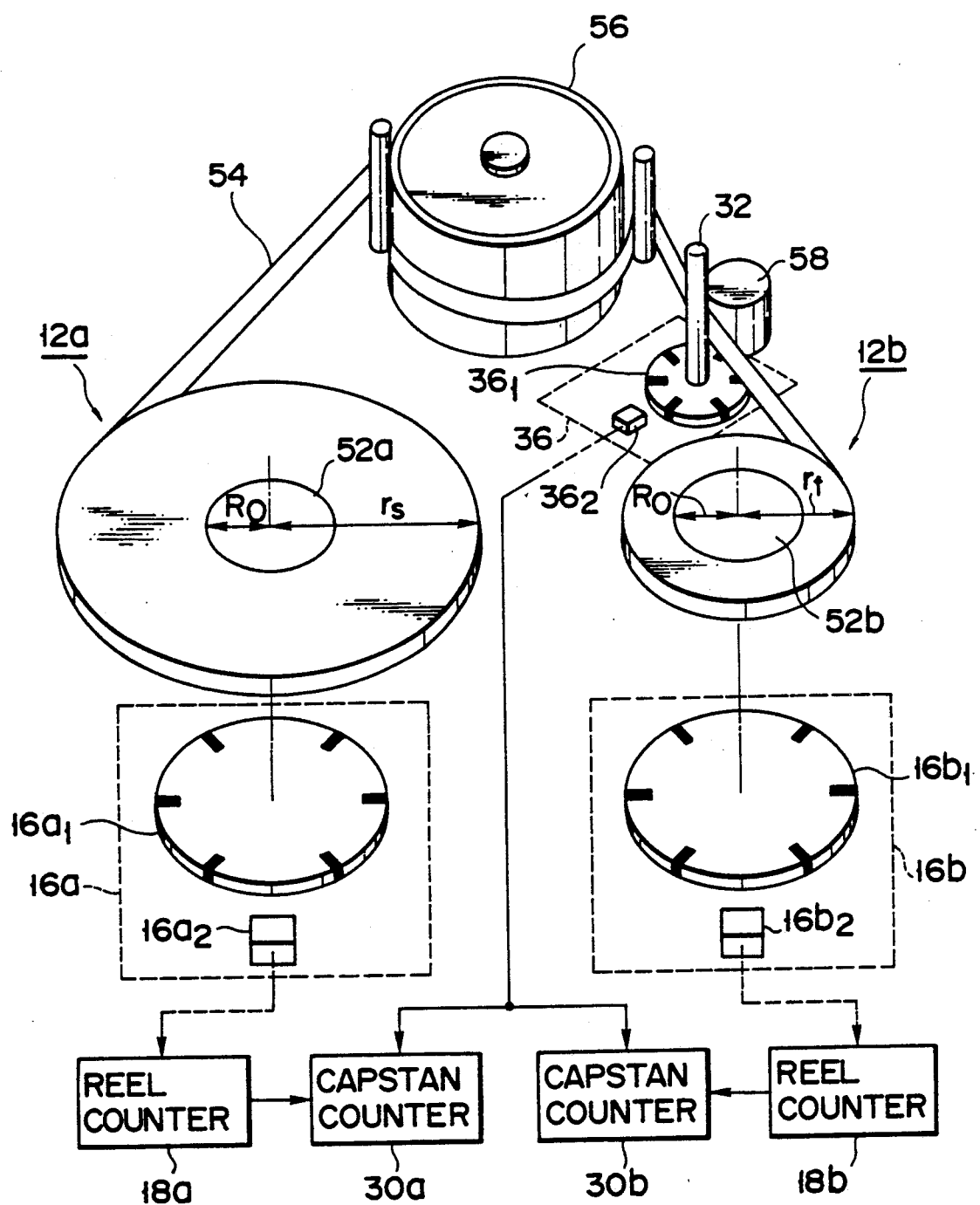
F I G. 2

APPARATUS FOR DISCRIMINATING TYPES OF TAPE CASSETTES

BACKGROUND OF THE INVENTION

1. Field of the Invention

The present invention relates to a tape cassette type discrimination apparatus and, more particularly, to a tape cassette type discrimination apparatus in a magnetic recording/reproducing apparatus such as a VHS video tape recorder, to which general and special type tape cassettes are loaded.

2. Description of the Related Art

Some conventional VHS video tape recorders (to be abbreviated to as VTRs hereinafter) have a function of discriminating a type of a tape cassette loaded in the VTR. The tape cassette is of a general type, and has an apparatus for discriminating the type of tape of the tape cassette. The apparatus detects a discrimination corresponding to the type of a tape to determine the (length) and hub diameter of the tape include T-20, T-30, T-40, T-60 and tapes having a small-diameter hub include T-80, T-90, T-100, T-120, T-140, T-160, and obtains a discrimination value inherent to the type of type to discriminate the type of tape. An example such as discrimination apparatus is disclosed in, e.g., Japanese Patent Disclosure (Kokai) Nos. 54-145513 and 58-29156. In the tape-type discrimination apparatus, if a rotational angular velocity of a supply reel is given by $W_S$; a rotational angular velocity of a take-up reel, $W_T$; a tape travel speed, $V$; the radius of a winding diameter of the supply reel, $r_S$; the radius of a winding diameter of the take-up reel, $R_T$; the radius of a hub diameter, $R_O$; the length of the tape, $L$; the thickness of the tape, $d$; the tape winding area of the supply reel, $S_S$; and the tape winding area of the take-up reel, $S_T$; the following relations are established:

$$r_S W_S = r_T W_T = V \quad (1)$$

$$S_S - \pi(r_S^2 - R_0^2) \quad (2)$$

$$S_T - \pi(r_T^2 - R_0^2) \quad (3)$$

From equations (2) and (3);

$$L \cdot d = S_S + S_T \quad (4)$$
$$= \pi(r_S^2 + r_T^2) - 2\pi R_0^2$$

$$r_S^2 + r_T^2 = \frac{L \cdot d}{\pi} + 2R_0^2 \quad (5)$$
$$= \left(\frac{V}{W_S}\right)^2 + \left(\frac{V}{W_T}\right)^2$$

More specifically, according to equation (5), the value of $r_S^2 + r_T^2$ is calculated to discriminate the type of tape. The discrimination result is used as data for detecting a tape position or tape remaining amount. More specifically, the tape position can be calculated from the above-mentioned equations (1) to (3). However, numerical values of a hub diameter, tape length, and tape thickness of the cassette are required as data for the arithmetic operation. These values vary depending on the types of cassette. Thus, these values are prestored in an accumulation means, and are read out and used in accordance with a cassette discrimination result. For example, detection of an actual tape position can utilize the known technique described in U.S. Pat. No. 4,172,231.

The amount of tape remaining can be obtained based on the tape position information as a result of the arithmetic operation and the tape length data, and tape transit control can be performed according to a tape position using the tape position information. For example, in a FF (fast-forward) or REW (rewind) mode, a tape end can be reliably detected to stop tape movement.

In the tape-type discrimination apparatus described above, when a compact cassette adapter in which a special type cassette having a smaller size (VHS-C cassette; referred to as a C-cassette hereinafter) is loaded in place of a general type tape cassette (normal VHS cassette; to be referred to as a VHS cassette hereinafter), it is difficult to determine that the type of the tape cassette is different. More specifically, the C-cassette adapter has different hub diameters at supply and take-up sides. In addition, rotation of a take-up drive unit of the C-cassette and rotation of the take-up reel of the adapter are different, e.g., have a rotation ratio of 2.34:1. For this reason, when the C-cassette adapter is loaded in a VTR, a special value inherent to the C-cassette adapter appears at a data top (in a state wherein almost no tape is taken up to a take-up side). However, at a data end (in a state wherein almost no tape is present at a supply side), a specific value of a VHS cassette having a small-diameter hub appears.

For this reason, when a tape is driven with the same driving means as is used for a normal VHS cassette, a rotation ratio of rotation of the take-up reel of the C-cassette adapter to that of the take-up drive unit of the C-cassette is 1:2.34. For this reason, when the C-cassette adapter is driven, a tape travel speed is slightly increased, and more tape tends to be taken up at an end portion of the tape. In order to solve this problem, the tape travel speed may be decreased at the tape end portion of the C-cassette adapter. However, in the method of decreasing the tape travel speed, when a normal tape cassette is loaded and driven, a tape take-up time is prolonged, and a tape cannot be uniformly wound.

SUMMARY OF THE INVENTION

It is therefore an object of the present invention to provide a tape cassette type discrimination apparatus which can reliably discriminate general and special type tape cassettes with a simple arrangement.

According to an aspect of the present invention, a tape cassette type discrimination apparatus comprising tape transit means for transition a tape of a tape cassette to be discriminated wound around first and second reels at a predetermined speed so that the tape is fed from one of the first and second reels and is taken up by the remaining reel, detection means for detecting rotations of the first and second reels to obtain a rotation ratio, control means for supplying a first control signal to the detection means at a predetermined timing so as to discriminate the tape cassette to be discriminated, and supplying a second control signal to the detection means at a timing delayed from the first control signal by a predetermined period of time, and discrimination means for discriminating a type of the tape cassette to be discriminated based on first and second rotation ratios of the first and second reels obtained by the detection means in accordance with the first and second control signals from the control means.

According to another aspect of the present invention, there is provided a tape cassette type discrimination apparatus comprising first signal generating means for generating a first signal corresponding to those rotations of first and second reels which are detected at a predetermined first position with respect to a tape of a tape cassette to be discriminated, which is wound around the first and second reels, first calculation means for calculating a first rotation ratio of the first and second reels based on the first signal generated by the first signal generating means, first and second drive means for rotating the first and second reels in a predetermined direction control means for controlling tape transition driven by the first and second drive means, second signal generating means for generating a second signal corresponding to those rotations of the first and second reels which are detected at a second position with respect to the tape after the first and second drive means perform rotation drive in the predetermined direction according to the control means, second calculation means for calculating a second rotation ratio of the first and second reels based on the second signal generated by the second signal generating means, and discrimination means for discriminating a type of the tape cassette to be discriminated based on the first and second rotation ratios calculated by the first and second calculation means.

BRIEF DESCRIPTION OF THE DRAWINGS

These and other features and advantages of the present invention will become more apparent from the following detailed description of exemplary embodiment as illustrated in the accompanying drawings in which:

FIG. 2 is a diagram schematically showing a tape transit system of a VTR to which the tape cassette type discrimination apparatus of the present invention is applied;

FIGS. 3A and 3B schematically show an interior of a C cassette adapter, in which FIG. 3A is a plan view, and FIG. 3B is a side sectional view;

DETAILED DESCRIPTION OF THE PREFERRED EMBODIMENT

An embodiment of the present invention will now be described with reference to the accompanying drawings.

Figure 1:
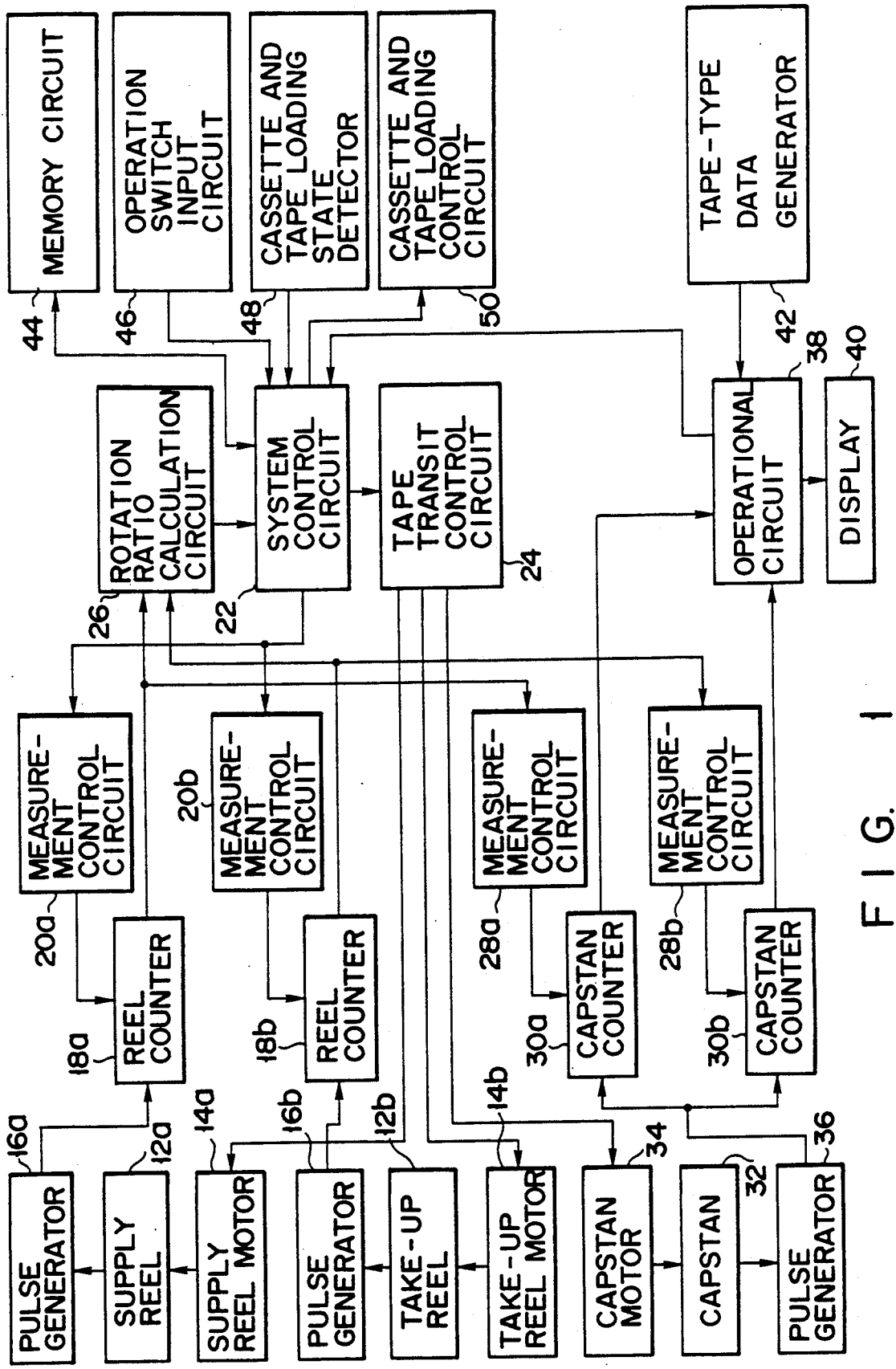
FIG. 1 is a block diagram schematically showing an arrangement of a tape cassette type discrimination apparatus of the present invention.

FIG. 1 is a block diagram of a tape cassette type discrimination apparatus according to an embodiment of the present invention. Reference numerals 12a and 12b denote a supply reel and a take-up reel which are respectively driven in a predetermined direction by supply reel motor 14a and take-up reel motor 14b. Rotations of supply reel 12a and take-up reel 12b are respectively detected by pulse generator 16a for detecting the rotation of the supply reel and pulse generator 16b for detecting the rotation of the take-up reel. Pulses output from pulse generators 16a and 16b are supplied to supply and take-up system reel counters 18a and 18b, respectively. Count intervals and timings of reel counters 18a and 18b are controlled by measurement control circuits 20a and 20b, respectively. Reel counters 18a and 18b are driven in accordance with a control signal from system control circuit 22. System control circuit 22 outputs a control signal to tape transit control circuit 24 so as to control drive operations of supply reel motor 14a and take-up reel motor 14b.

The outputs from reel counters 18a and 18b are supplied to rotation ratio calculation circuit 26. Rotation ratio calculation circuit 26 calculates a rotation ratio (T/S) of the supply reel (S reel) to the take-up reel (T reel) of a tape. Circuit 26 supplies the calculation result to system control circuit 22. The outputs from reel counters 18a and 18b are also supplied to measurement control circuits 28a and 28b, respectively. Measurement control circuits 28a and 28b control count operations of capstan counters 30a and 30b during a period wherein input count values have predetermined values. Capstan counters 30a and 30b receive an output from pulse generator 36 for detecting rotation of capstan motor 34 which drives capstan 32 for transiting a tape. Note that capstan motor 34 is driven by a control signal from tape transit control circuit 24 as in supply reel motor 14a and take-up reel motor 14b.

The count values of capstan counters 30a and 30b are output to operational circuit 38. Operational circuit 38 utilizes the count values as discrimination data to determine the type of tape cassette and remaining amount of a tape. Of these data, the tape remaining amount is displayed on display 40. Furthermore, operational circuit 38 is coupled to tape-type data generator 42. This tape-type data generator 42 stores data relating to the hub diameter, overall tape length, tape thickness, etc. of each type, and outputs parameters according to a type of tape used, and supplies control circuit 22 with a calculation result which is based on the parameters.

System control circuit 22 is coupled to memory circuit 44, which stores the S/T rotation ratio of the S reel to the T reel, and the calculation result from operational circuit 38. The storage data are read out from memory circuit 44 as needed.

System control circuit 22 is connected to operation switch input circuit 46 such as an operation button, cassette and tape loading state detector 48, and cassette and tape loading control circuit 50 so as to control the tape transit system. Operation switch input circuit 46 supplies operation input signals of various functions in the tape transit system, such as playback, stop, recording, fast forward, rewind operations, and the like to system control circuit 22 upon operation of operation buttons. Cassette and tape loading state detector 48 detects both a cassette loading state in VTR equipment and a tape-loaded state, i.e., a state where the tape pulled out of the cassette is wound around the video head-provided cylinder, and supplies a detection signal to system control circuit 22. System control circuit 22 controls cassette and tape loading control circuit 50 to control insertion, unloading, and tape loading of the tape cassette, and controls tape transit control circuit 24 to transit a tape.

FIG. 2 schematically shows the tape transit system of the VTR. Normally, a VTR tape has supply reel 12a and take-up reel 12b in a frame (not shown) of the cassette. Tape 54 is wound around hubs 52a and 52b at the central portions of these reels 12a and 12b. When the cassette tape is inserted in the VTR equipment, reels 12a and 12b are mounted on reel bases (not shown). These reel bases are rotated by supply and take-up reel motors 14a and 14b in a predetermined direction, so that tape 54 is transited from one reel to the other reel.

During a recording or playback operation in the VTR, tape 54 is wound around a cylinder having rotary head 56 by a predetermined operation. Pinch roller 58 presses tape 54 against capstan 32 between head 56 and take-up reel 12b. Capstan 32 is rotated by capstan motor 34, thereby starting tape transit. Note that pulse generator 36 described above is arranged below capstan 32. Pulse generator 36 comprises rotary disk 36a around which a plurality of (e.g., 6 in FIG. 2) magnets are attached, and magnetic sensor $36_2$. As described above, output pulses from pulse generator 36 are supplied to capstan counters 30a and 30b to be counted.

Pulse generators 16a and 16b are arranged below reels 12a and 12b, respectively. These pulse generators 16a and 16b have the same arrangement as that of pulse generator 36, that is, comprise rotary disks $16a_1$ and $16b_1$ and magnetic sensors $16a_2$ and $16b_2$. As described above, output pulses from pulse generators 16a and 16b are supplied to reel counters 18a and 18b to be counted, respectively, and are also supplied to capstan counters 30a and 30b.

Figure 3A:
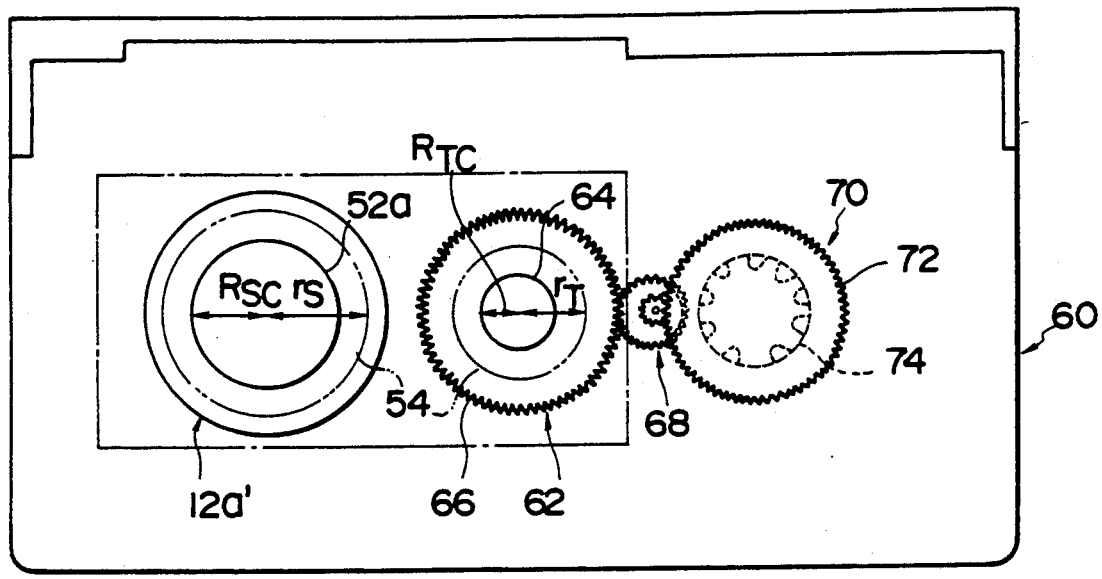
Figure 3B:
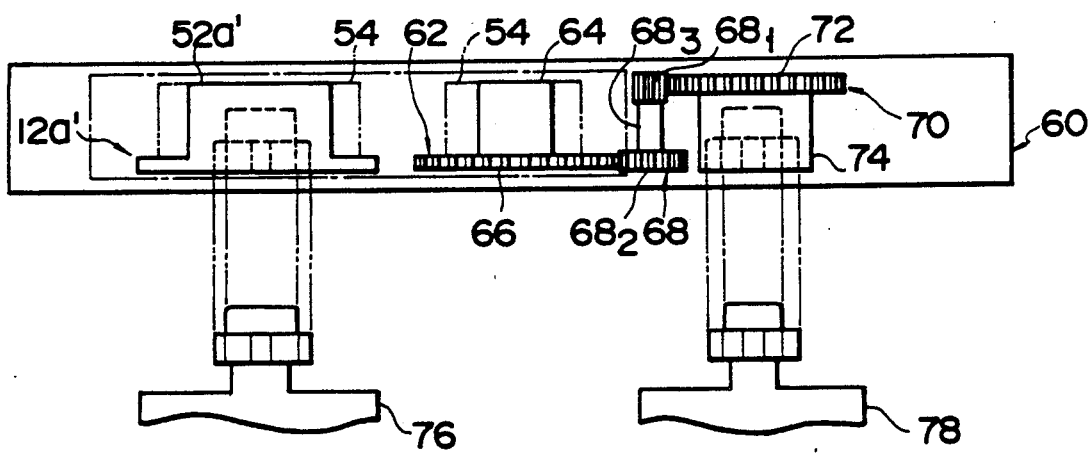

FIGS. 3A and 3B schematically show a C-cassette adapter. In FIGS. 3A and 3B, reference numeral 60 denotes a C-cassette adapter body. As described above, the C-cassette adapter is a tape cassette in which a C-cassette is inserted, and has the same outer dimensions as those of a VHS cassette. In FIGS. 3A and 3B, a portion indicated by an alternate long and short dashed line represents the outer dimensions of the C-cassette.

The C-cassette in the C-cassette adapter accommodates C-cassette supply reel 12a' common to the VHS cassette supply reel, and C-cassette take-up reel 62 exclusively used for the C-cassette. Tape 54 is wound around hubs 52a' and 64 at the central portions of these reels 12a' and 62. C-cassette take-up reel 62 has a function of a gear since a predetermined number of teeth 66 are formed therearound. Teeth 66 are meshed with intermediate gear 68 (to be described later). On the other hand, at a position where a take-up reel for a VHS cassette is to be present, C-cassette adapter take-up reel 70 is located. A predetermined number of teeth 72 are formed around adapter take-up reel 70, and are meshed as a gear with intermediate gear 68. Hub 74 having the same diameter as that of a small-diameter hub of the VHS cassette is formed on adapter take-up reel 70. Intermediate gear 68 is used for transmitting rotation received by adapter take-up reel 70 to C-cassette take-up reel 62, and comprises first gear $68_1$ meshed with adapter take-up reel 70, second gear $68_2$ meshed with C-cassette take-up reel 62, and shaft $68_3$ for coupling first and second gears $68_1$ and $68_2$. When C-cassette adapter 60 described above is inserted in the VTR equipment, C-cassette supply reel 12a' is mounted on supply reel base 76, and adapter take-up reel 70 is mounted on take up reel base 78.

The operation of this embodiment will be described below.

When a tape cassette is loaded in the VTR equipment and a desired operation button is operated, an operation input signal is supplied from operation switch input circuit 46 to system control circuit 22. System control circuit 22 supplies a control signal to cassette and tape loading control circuit 50 to cause pinch roller 58 to press tape 54 against capstan 32, thus completing tape loading. Thereafter, system control circuit 22 controls tape transit control circuit 24 to transit a tape. In this case, in tape transit modes by capstan motor 34, i.e., a playback mode, a recording mode, a forward high-speed playback mode called a fast-forward playback mode (CUE), a reverse direction high-speed playback mode called a rewind playback mode (REVIEW), and the like, reel counters 18a and 18b which are reset are set in a measurement mode through measurement control circuits 20a and 20b. More specifically, upon rotation of supply reel 12a and take-up reel 12b, pulses are generated by pulse generators 16a and 16b, and are respectively supplied to reel counters 18a and 18b. Measurement data supplied to reel counters 18a and 18b are supplied to rotation ratio calculation circuit 26. Rotation ratio calculation circuit 26 calculates the number of revolutions of take-up reel 12b per revolution of supply reel 12a, and then calculates rotation ratio T/S. The measurement data are also supplied to and stored in memory circuit 44 through system control circuit 22.

During revolution of supply reel 12a and take-up reel 12b, pulses generated from capstan rotation detection pulse generator 36 are output to capstan counters 30a and 30b to be measured. The measurement data of one capstan counter 30a corresponds to a tape transit amount during one revolution of supply reel 12a. The measurement data of the other capstan counter 30b corresponds to a tape transit amount during one revolution of take-up reel 12b. Note that the measurement data of capstan counters 30a and 30b are supplied to operational circuit 38, and are used as calculation parameters together with a signal from tape-type data generator 42 so as to discriminate the type of tape (time depending on the length of tape) and to obtain a tape remaining amount.

In this case, winding diameter $r_S$ of supply reel 12a is calculated by:

$$
\begin{aligned}
r_S &= \{(\text{radius of capstan}) \\
&\quad /(\text{capstan pulse count per revolution of capstan})\} \times \\
&\quad (\text{capstan pulse count per revolution of supply reel}) \\
&= \{(\text{capstan pulse count per revolution of supply reel}) \\
&\quad /(\text{capstan pulse count for every 1 sec.}) \times 2\pi\} \times V
\end{aligned}
\tag{6}
$$

Similarly, winding diameter $r_T$ of the take-up reel is calculated. These winding diameters $r_S$ and $r_T$ are used for calculating a tape specific value as the sum of squares of the winding diameters, i.e., according to the following relation:

$$r_S^2 + r_T^2$$

Tape discrimination is made based on the tape specific value. Note that the value given by $r_S^2 + r_T^2$ will be referred to as a tape discrimination value hereinafter.

Figure 4:
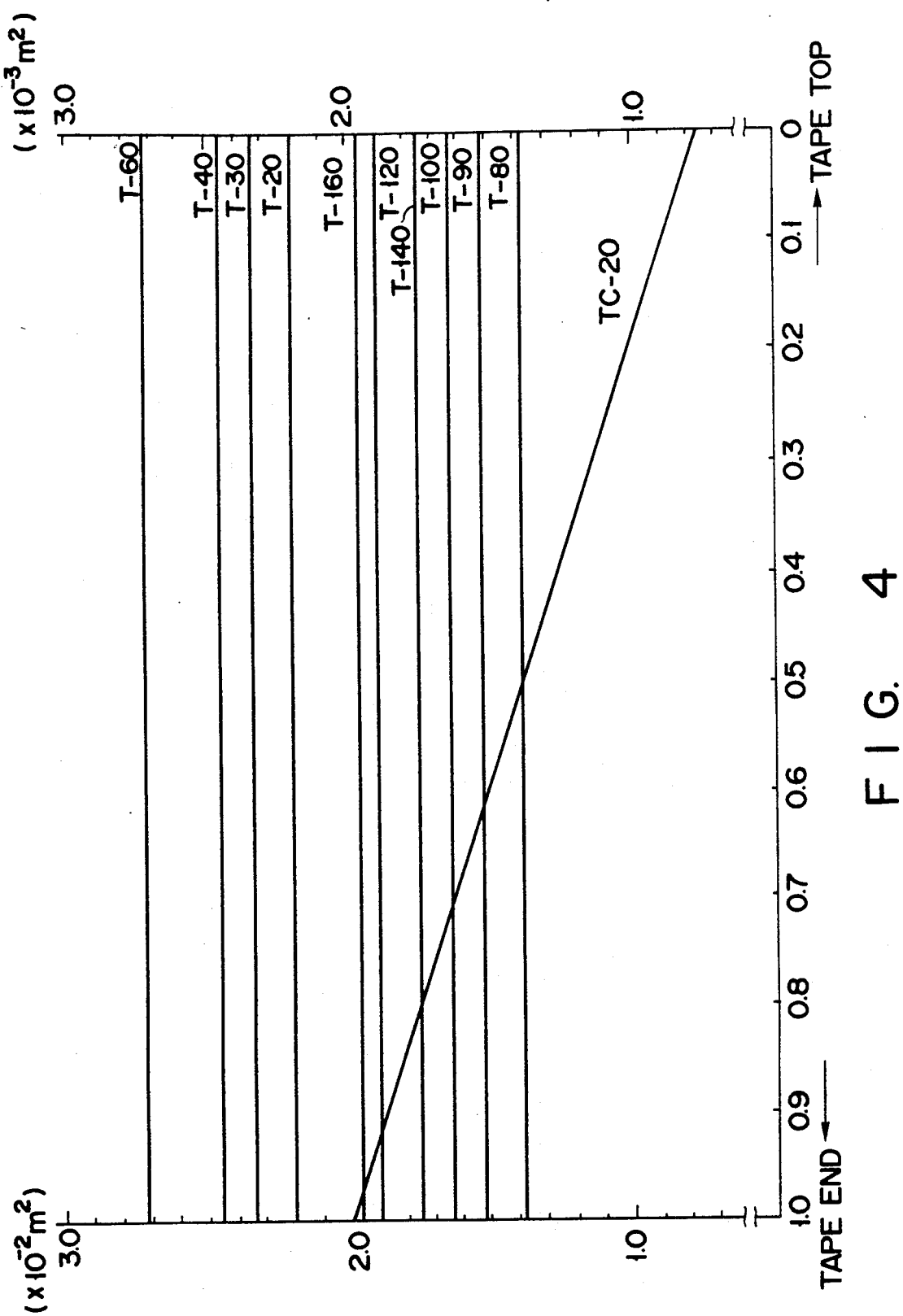
FIG. 4 is a graph showing the relationship between tape positions of various tapes and $r_S^2 + r_T^2$.

For example, for a VHS cassette and a C-cassette adapter used for a VHS VTR, reference is made to the graph showing the relationship between the tape position of the tape cassette and the tape discrimination value $(r_S^2 + r_T^2)$ shown in FIG. 4. Note that in FIG. 4, for the tape position, a tape end is given by 1.0, and a tape top is given by 0. T-20, T-30, T-40, T-60, T-80, T-90, T-100, T-120, T-140, and T-160 represent types of VHS cassettes, and TC-20 represents a C-cassette. As can be seen from FIG. 4, T-20 to T-120 tape cassette classifications are realized for the VHS cassettes and the C-cassette adapter. Since the tape specific values of T-140 and T-160 tapes having type thicknesses different from those of T-20 to T-120 tapes overlap those of T-100 and T-120 tape cassettes, they can be discriminated by the signal from tape-type data generator 42.

The tape discrimination value $(r_S^2 + r_T^2)$ of the C-cassette adapter linearly changes according to the tape position, and does not have a constant value. For this reason, the tape discrimination value $(r_s^2 + r_T^S)$ at an identical position are detected and compared, so that the tape specific value of the C-cassette and the specific values of the (VHS tape) tape cassettes having a small-diameter hub (T-80 to T-160, T-168) can be discriminated from the specific values of the tape cassettes having a large-diameter hub (T-20 to T-60). However, it is difficult to discriminate the C-cassette adapter from the tape cassette having a small-diameter hub. Discrimination of the C-cassette adapter and the tape cassette having the small-diameter hub is made based on the measurement data of rotation ratio calculation circuit 26.

Figure 5:
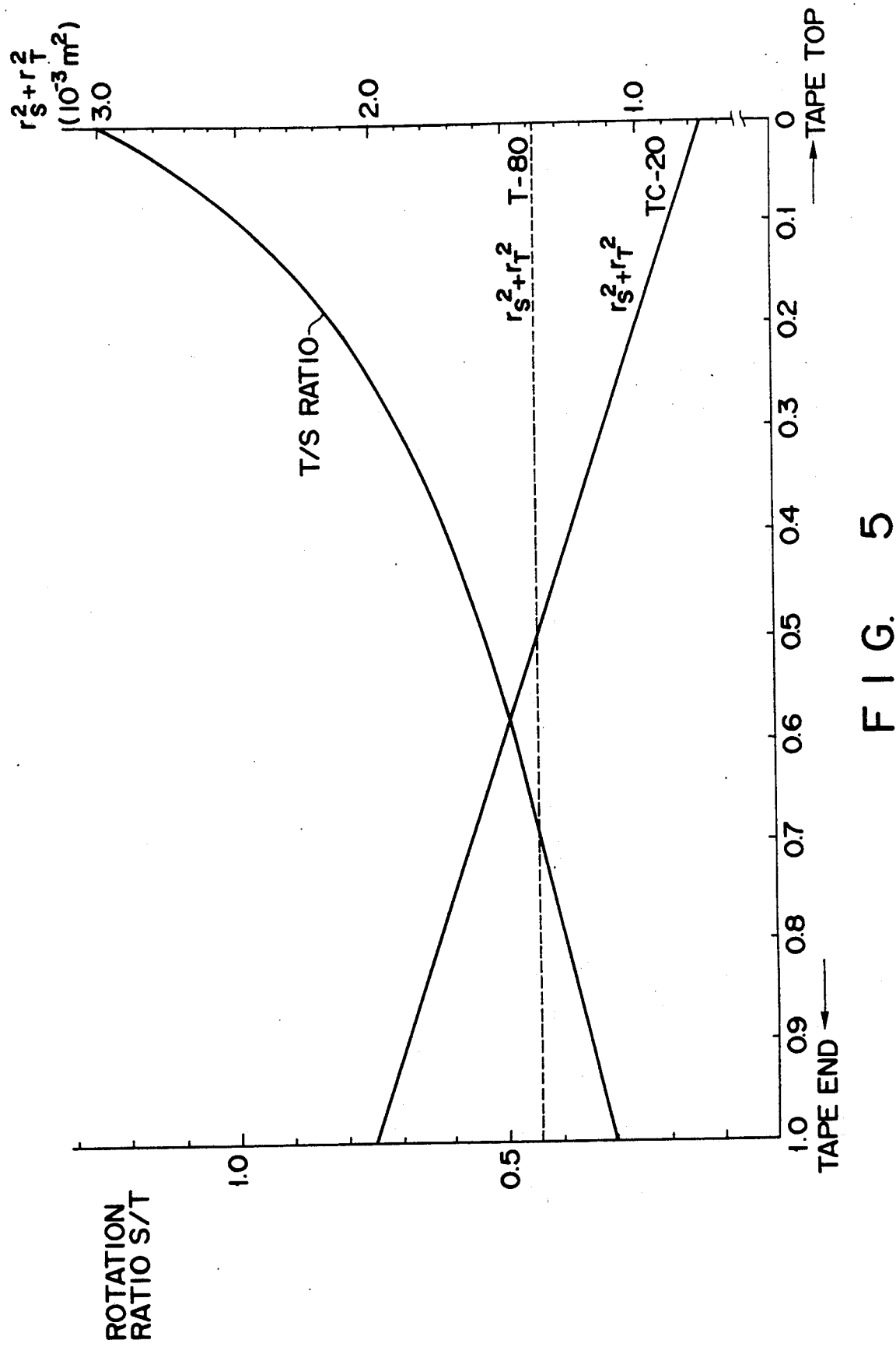
FIG. 5 is a graph showing the relationship among tape positions of various tapes, a rotation ratio of a cassette, and, $r_S^2 + r_T^2$

FIG. 5 is a graph showing the relationship among rotation ratio T/S, the tape discrimination value $(r_S^2 + r_T^2)$ of the tape cassette, and the tape position. Note that for the tape position, a tape end is given by 1.0, and a tape top is given by 0, and T-80 and TC-20 represent tape cassettes. More specifically, discrimination of the C-cassette adapter and the tape cassette having a small-diameter hub can be made by detecting and comparing the tape discrimination values at two positions of different rotation ratios T/S shown in FIG. 5. More specifically, the discrimination utilizes characteristics in that the discrimination value changes depending on the tape position since the tape cassette discrimination value of the C-cassette adapter linearly changes as described above. Thus, when the tape discrimination values at two different positions coincide with each other, the tape cassette having a small-diameter hub is determined. If the tape discrimination values at two different positions are different from each other, the C-cassette adapter can be determined.

Figure 6A:
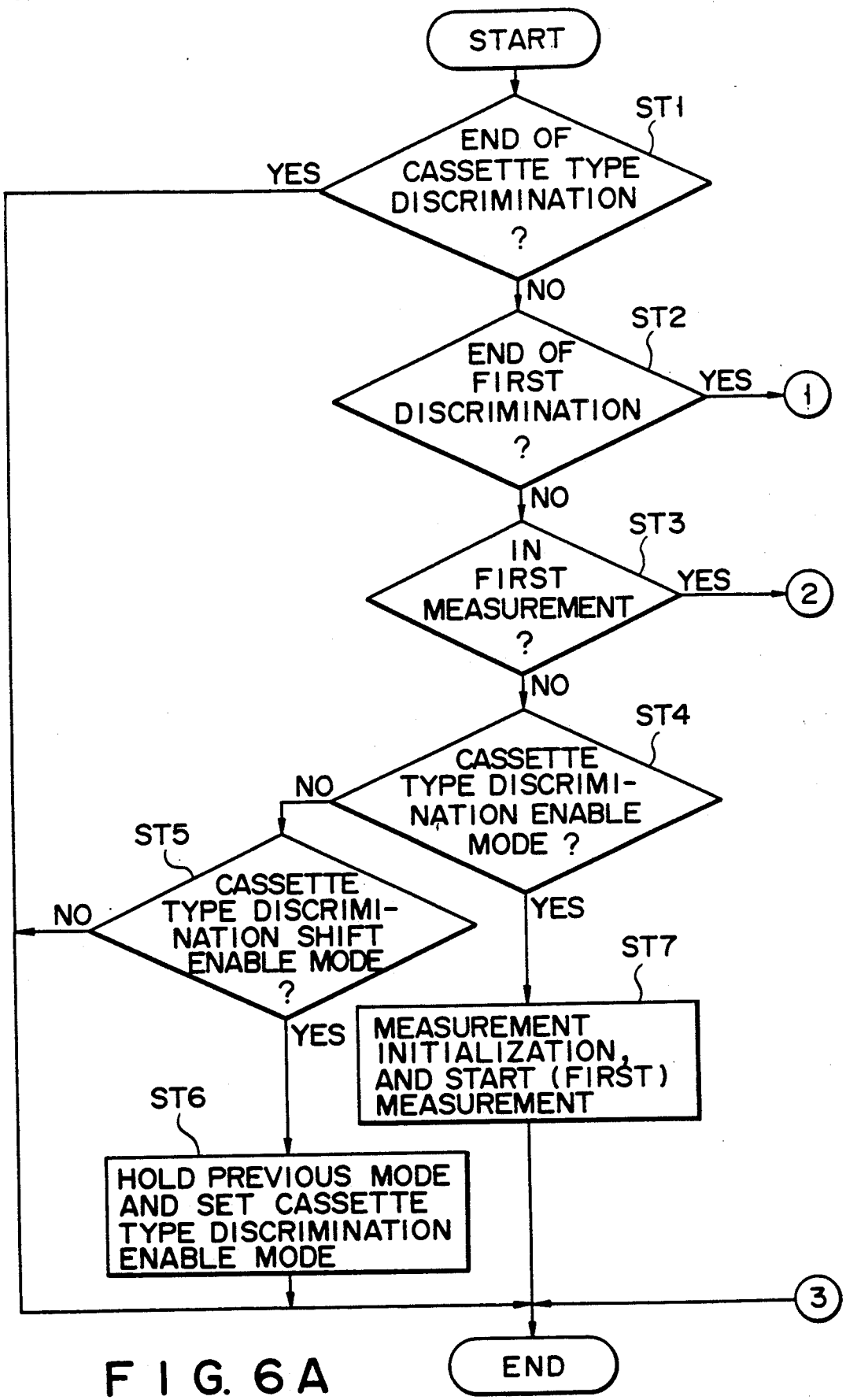
FIGS. 6A through 6C are flowcharts showing an operation of a type discrimination mode of tape cassette.
Figure 6B:
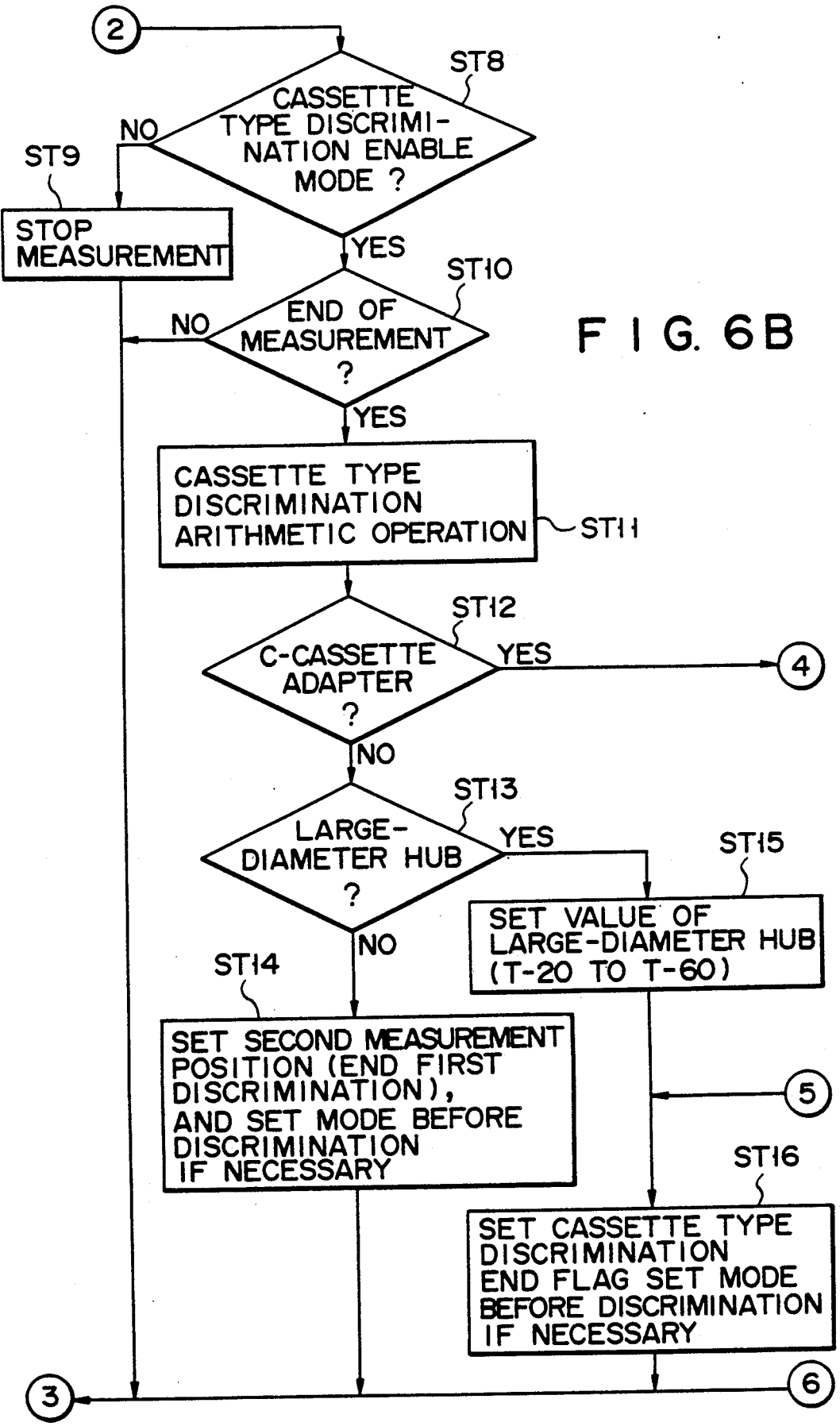
Figure 6C:
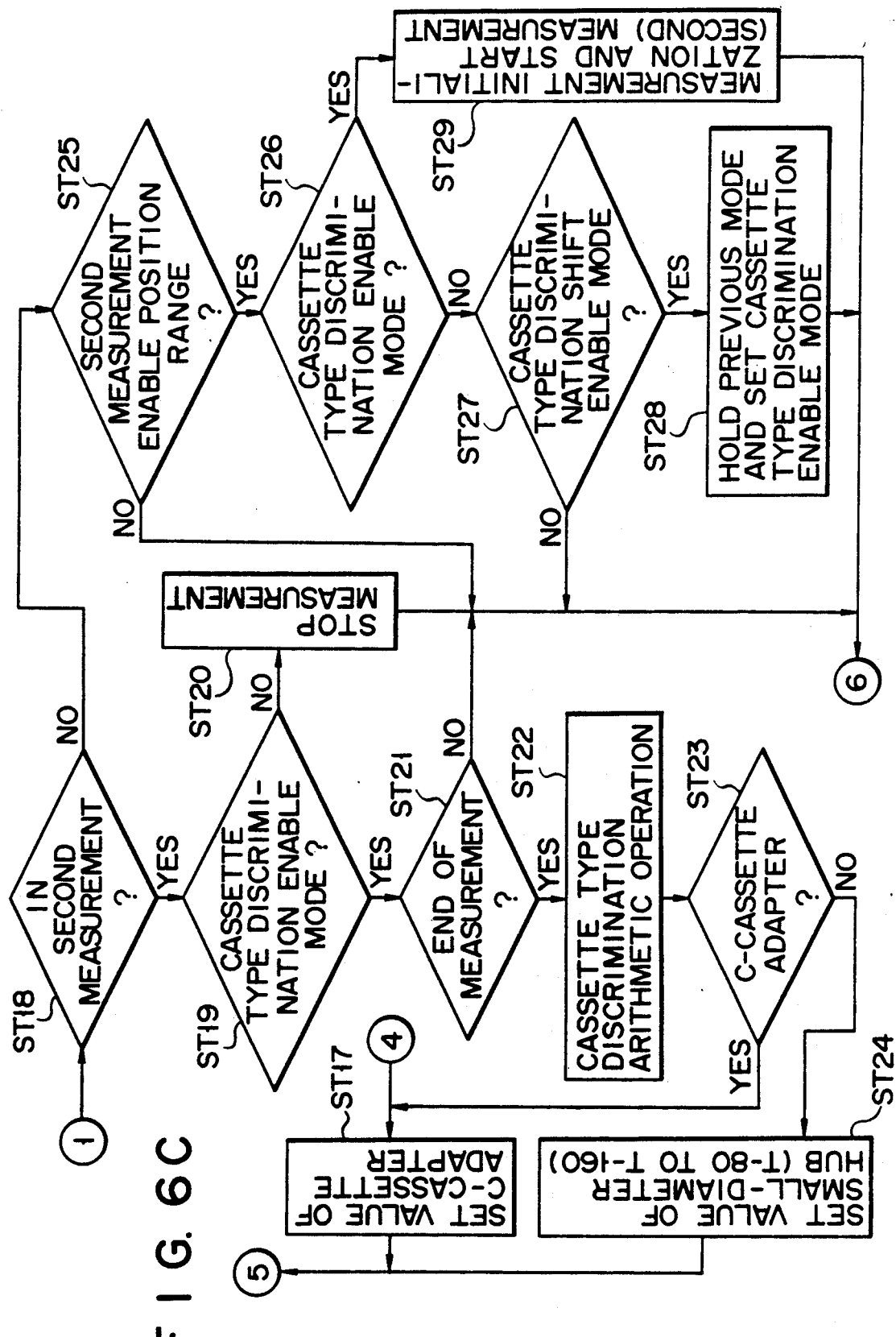

The type discrimination operation of a tape cassette will be described below with reference to the flowcharts shown In FIGS. 6A through 6C.

When the tape cassette is loaded in VTR equipment, it is checked in step ST1 if discrimination of a cassette type is ended. If YES in step ST1, the type discrimination operation is ended. If NO in step ST1, the flow advances to step ST2 to check if a first discrimination is ended. If NO in step ST2, the flow advances to step ST3 to check if a first measurement is being performed. If NO in step ST3, it is checked in step ST4 if a cassette type discrimination enable mode is set; otherwise, the flow advances to step ST8 (to be described later).

If NO in step ST4, it is checked in step ST5 if a cassette type discrimination shift enable mode is set. If NO in step ST5, the flow is ended; otherwise, the flow advances to step ST6. In step ST6, the previous mode is held, and the cassette type discrimination enable mode is set. Thereafter, the flow is ended. In this case, if the previous mode is an FF (fast-forward) mode, a high-speed forward playback (CUE) mode is set. If the previous mode is an REW (rewind) mode, a highspeed reverse playback (REVIEW) mode is set. If YES in step ST4, measurement initialization is performed and the first measurement is started in step ST7. Thereafter, the flow is ended.

When YES is obtained in step ST3 and the flow advances to step ST8, it is checked in step ST8 if the cassette type discrimination enable mode is set. If NO in step ST8, the flow advances to step ST9, and the measurement is stopped. If YES in step ST8, it is checked in step ST10 if a measurement is ended. If YES in step ST10, the flow advances to step ST11, and an arithmetic operation required for discriminating a cassette type is performed by operational circuit 38 and the like. As a result, it is checked in step ST12 if a C-cassette adapter is used. If NO in step ST12, it is checked in step ST13 if a tape cassette having a large-diameter hub is used.

If it is determined in step ST13 that the hub of the loaded tape cassette is not a large-diameter hub but is a small-diameter hub, the first discrimination is ended and a second measurement position is set in step ST14. In this case, a mode before the discrimination is resumed if necessary. If YES in step ST13, a specific value of the large-diameter hub (T-20 to T-60) is set in step ST15. The flow then advances to step ST16 and a cassette type discrimination flag is set. In this case, a mode before the discrimination is resumed if necessary. In steps ST14 and ST16, if the previous mode is the FF mode, the CUE mode is set, and if the previous mode is the REW mode, the REVIEW mode is set.

If YES in step ST12, the flow advances to step ST17, and a specific value of the C-cassette adapter is set. The flow then advances to step ST16 described above.

If it is determined in step ST2 that the first discrimination is ended, the flow advances to step ST18 to check if a second measurement is being performed. If NO in step ST18, the flow advances to step ST25 (to be described later); otherwise, the flow advances to step ST19.

If NO in step ST19, the flow advances to step ST20 and the measurement is stopped. The flow is then ended. If YES in step ST19, the flow advances to step ST21 to check if the measurement is ended. If YES in step ST21, the flow advances to step ST22, and the arithmetic operation required for discriminating the cassette type is performed by operational circuit 38 and the like. As a result, it is checked in step ST23 if a C-cassette adapter is used. If YES in step ST23, the flow advances to step ST17 described above, and the specific value of the C-cassette adapter is set. Thereafter, the flow advances to step ST16. On the other hand, if NO in step ST23, the flow advances to step ST24, and a specific value of a small-diameter hub (T-80 to T-160) is set. The flow then advances to step ST16, and the cassette type discrimination end flag is set.

If it is determined in step ST18 that the second measurement is not performed, it is checked in step ST25 if a second measurement enable position range is detected. If NO in step ST25, the flow is ended; otherwise, the flow advances to step ST26 to check if the cassette type discrimination enable mode is set. In step ST26, whether or not the cassette type discrimination mode is set is determined. If NO in step ST26, the flow advances to step ST27 to check if a cassette type discrimination shift enable mode is set. If NO in step ST27, the flow is ended. If YES in step ST27, the flow advances to step ST28, and the previous mode is held, and the cassette type discrimination enable mode is set. Thereafter, the flow is ended. In this case, if the previous mode is the FF mode, the CUE mode is set, and if the previous mode is the REW mode, the REVIEW mode is set, in the same manner as in step ST16. If YES in step ST26, measurement initialization is performed and second measurement is started in step ST29.

The tape cassette type discrimination operation is performed along the flow described above.

When the above-mentioned remeasurement is performed, if none of the capstan rotation modes such as the playback, recording, CUE, REVIEW modes is set, system control circuit 22 controls tape transit control circuit 24 to automatically set the capstan rotation mode. In this case, in order to shorten a measurement time, the CUE/REVIEW mode is preferably set.

Discrimination of the type of tape cassette is made by obtaining tape discrimination values at two different tape positions. However, if either a tape cassette having a large-diameter hub or a C-cassette adapter is determined by measurement at the first position, the C-cassette adapter and T-20 to T-60 tape cassettes can be determined at the first position alone. If a tape cassette having a small-diameter hub is determined by measurement at the first position, the tape cassette and the C-cassette adapter are determined by measurement at the second position. Then, discrimination of a tape cassette having a small-diameter hub and a C-cassette adapter is made by measurement at the second position.

When discrimination of the tape cassette having the small-diameter hub and the C-cassette adapter is performed by measurement at the second position, the measurement is performed at a tape position which can be distinctly discriminated in accordance with the ratio of the numbers of revolutions of supply and take-up reels. Thus, the measurement values of the tape discrimination values and cassette inherent values need only be compared to perform discrimination.

A tape cassette discrimination value corresponding to rotation ratio T/S of the C-cassette adapter can be prestored in memory circuit 44, so that values at two tape positions having different rotation ratios can be compared with the prestored value to perform discrimination.

Discrimination of the tape cassette having the small-diameter hub and the C-cassette adapter can also be made as follows. That is, the radius of the supplyside hub diameter of the C-cassette is represented by $R_{SC}$, and the radius of the take-up side hub diameter is represented by $R_{TC}$. Thus, if these parameters are substituted in radius $R_O$ of the hub diameter of equations (2) to (5) described above, $$S_S = \pi(r_S^2 - R_{SC}^2) \qquad (2)'$$

Since the rotation ratio of supply reel 12a' and take-up reel 62 is 1:2.34, $$S_T = \pi\left\{\left(\frac{r_T}{2.34}\right)^2 - R_{TC}^2\right\} \qquad (3)'$$

$$L \cdot d = S_S + S_T \qquad (4)'$$

$$= \pi\left\{r_S^2 + \left(\frac{r_T}{2.34}\right)^2\right\} - \pi(R_{SC}^2 + R_{TC}^2)$$

Therefore, $$r_S^2 + \left(\frac{r_T}{2.34}\right)^2 = \frac{L \cdot d}{\pi} + R_{SC}^2 + R_{TC}^2 \quad (5)'$$

(... C-cassette inherent value)

From this equation, the tape discrimination values $r_S^2 + r_T^2$ and $r_S^2 + (r_T/2.34)^2$ are calculated, and values at two positions having different rotation ratios are compared to perform discrimination.

In this manner, the tape cassette type discrimination apparatus of the present invention detects rotational angular velocities, and rotation ratio of the supply and take-up reels and tape transit speeds of a tape cassette loaded in the VTR equipment. The sums of squares of winding diameters $r_1$ and $r_2$ of the supply and take-up reels at two tape positions having different rotation ratios, i.e., $r_1^2 + r_2^2$ as tape discrimination values are obtained, and the tape cassettes of different types are discriminated based on the values of $r_1^2 + r_2^2$. Thus, different types of tape cassettes including a tape cassette in which hub diameters of supply and take-up reels are different from each other can be reliably discriminated. Therefore, the present invention can contribute to stable, high-precision tape control of different types of tape cassettes.

What is claimed is:

1. An apparatus for discriminating a type of a tape cassette which is wound around first and second reels, comprising:
    tape transmit means for feeding a tape of a tape cassette to be discriminated from one of the first and second reels to the other reel, at a predetermined speed;
    detection means for detecting a ratio of rotation of said first reel to rotation of said second reel;
    control means for supplying a first control signal to said detection means at a first timing and supplying a second control signal to said detection means at a second timing delayed from the first control signal by a predetermined period of time; and
    discrimination means for discriminating a type of the tape cassette on the basis of the ratios detected by said detection means at both said first and second timing, in response to the first and second control signals supplied form said control means.

2. An apparatus according to claim 1, wherein said detection means detects rotational angular velocities of said first and second reels to detect the rotation ratio of said first and second reels.

3. An apparatus according to claim 2, wherein said detection means comprises first and second pulse generating means for detecting rotations of said first and second reels to generate pulses, first and second counting means for counting the pulses output from said first and second pulse generating means, respectively, first and second measurement control means for setting count periods of said first and second counting means, and rotation ratio calculating means for calculating the rotation ratio of said first and second reels based on the count values from said first and second counting means in the count periods.

4. An apparatus according to claim 1, wherein said discrimination means comprises operational means for calculating a discrimination value of said tape cassette to be discriminated based on a rotation ratio of the first and second reels at said first and second times, and discriminating means for discriminating the type of said tape cassette to be discriminated based on the discrimination value of said tape cassette to be discriminated calculated by said operational means.

5. An apparatus according to claim 4, wherein said operational means calculates a sum of squares of winding diameters of said first and second reels based on the rotation ratio, thereby calculating the discrimination value.

6. An apparatus according to claim 5, wherein said discriminating means discriminates the type of said cassette to be discriminated based on whether or not the discrimination values calculated by said operational means are different values.

7. An apparatus according to claim 6, wherein said discriminating means further discriminates the type of said tape cassette to be discriminated by comparing the calculated discrimination value with a predetermined discrimination value.

8. An apparatus according to claim 7, further comprising memory means for prestoring the predetermined discrimination value to be compared with the discrimination value calculated by said operational means in said discriminating means.

9. An apparatus for discriminating a type of a tape cassette to be discriminated which is wound around first and second reels, comprising:
   first signal generation means for generating a first signal corresponding to rotation of the first and second reels at a first position of a tape of the tape cassette to be discriminated;
   first calculation means for calculating a first ratio of the rotation of the first reel to the rotation of the second reel in response to and at a time of the first signal generated by said first signal generation means;
   first and second drive means for rotating the first and second reels in predetermined directions;
   control means for controlling transition of the tape driven by said first and second drive means;
   second signal generating means for generating a second signal corresponding to the rotation of the first and second reels at a second position of the tape after said first position and after said control means causes said first and second drive means to rotate the first and second reels in the predetermined directions;
   second calculation means for calculating a second ratio of the rotation of the first reel to the rotation of the second reel in response to and at the time of the second signal generated by said second signal generation means; and
   discrimination means for discriminating a type of the tape cassette on the basis of both the first and second ratios calculated by said first and second calculation means.

10. An apparatus according to claim 9, wherein said first and second signal generation means comprise first and second pulse generating means for generating first and second pulse signals in correspondence with rotations of the first and second reels which are detected at the first and second position, respectively.

11. An apparatus according to claim 10, wherein said first and second calculation means comprise first and second counters for counting pulse counts of the first and second pulse signals output from said first and second pulse generating means, first and second measurement control means for setting count periods of said first and second counters, said first and second rotation ratio calculation means for calculating the first and second rotation ratios based on the pulse counts counted by said first and second counters during the count periods set by said first and second measurement control means.

12. An apparatus according to claim 11, wherein said discrimination means comprises operational means for calculating first and second discrimination values of said tape cassette to be discriminated based on said ratios calculated by said first and second rotation ratio calculation means, and type discriminating means for discriminating the type of said tape cassette to be discriminated in accordance with the first and second discrimination values of said tape cassette to be discriminated calculated by said operational means.

13. An apparatus according to claim 12, wherein said operational means calculates the first and second discrimination values by obtaining sums of squares of winding diameters of said first and second reels based on the first and second rotation ratios calculated by said first and second rotation ratio calculation means.

14. An apparatus according to claim 13, wherein said discriminating means discriminates the type of said tape cassette to be discriminated based on whether or not the first and second discrimination values calculated by said operational means are different values.

15. An apparatus according to claim 13, wherein said discriminating means discriminates the type of said tape cassette based on whether or not the first and second discrimination values calculated by said operational means are different, and discriminates the type of said tape cassette to be discriminated by comparing the first and second discrimination values with a predetermined discrimination value.

16. An apparatus according to claim 15, further comprising: memory means for prestoring the predetermined discrimination value to be compared with the first and second discrimination values calculated by said operational means in said discriminating means.

* * * * *